United States Patent [19]

Lay

[11] 4,351,406

[45] Sep. 28, 1982

[54] VELOCIPEDE FOR THE PHYSICALLY HANDICAPPED

[76] Inventor: Larry D. Lay, 26078 Alger, Madison Heights, Mich. 48071

[21] Appl. No.: 178,033

[22] Filed: Aug. 14, 1980

Related U.S. Application Data

[63] Continuation-in-part of Ser. No. 965,573, Dec. 1, 1978, Pat. No. 4,284,157.

[51] Int. Cl.[3] .................................................. B60K 1/00

[52] U.S. Cl. ................................ 180/65 R; 128/25 R; 180/205; 272/114; 280/256; 280/267; 280/287; 280/775

[58] Field of Search ...................... 180/19 R, 60, 65 R, 180/216, 220, 298, 291, 293, 294, 297, 311, 312, 231, DIG. 3; 272/93, 114, 116, 125; 128/25 R, 33, 80 R, 80 F, 80 G, 44, 48, 51; 280/1.1 R, 1.11 R, 29, 200, 210, 211, 220, 221, 223, 226, 230, 234, 235, 240, 241, 252-263, 289 NC, 289 D, 290, 291, 294, 87, 87.1, 771, 274, 275, 281 R, 287, 295, 298; 474/101, 106-112, 901-93, 135-138

[56] References Cited

U.S. PATENT DOCUMENTS

| | | | |
|---|---|---|---|
| 1,744,746 | 1/1930 | Brown | 474/135 |
| 1,835,617 | 12/1931 | Stewart | 474/135 |
| 2,641,249 | 6/1953 | Brockman | 128/25 R |
| 2,663,376 | 12/1953 | Curley | 180/19 R |
| 2,993,709 | 7/1961 | Wick | 280/287 |
| 3,598,195 | 8/1971 | Steller | 180/216 X |
| 3,827,519 | 8/1974 | Snider | 180/216 X |
| 3,920,263 | 11/1975 | Bundschuh | 280/267 X |
| 3,960,392 | 6/1976 | Read | 280/287 X |
| 4,132,435 | 1/1979 | Wilson | 280/275 X |

FOREIGN PATENT DOCUMENTS

| | | | |
|---|---|---|---|
| 2843193 | 4/1980 | Fed. Rep. of Germany | 280/287 |
| 916833 | 12/1946 | France | 280/287 |

*Primary Examiner*—Joseph F. Peters, Jr.
*Assistant Examiner*—M. J. Hill
*Attorney, Agent, or Firm*—Basile, Weintraub & Hanlon

[57] ABSTRACT

An amusement and exercising vehicle for physically handicapped persons is driven by a motor. Operational movement of the drive mechanism is translated into reciprocal movement of the foot pedals. The foot pedals are provided with orthopedic braces for supporting the legs of the driver whereby the legs are supported for exercising movement by the motor during movement of the vehicle. In a second embodiment, the vehicle is further provided with a motorized drive mechanism to permit operation of the drive mechanism and the corresponding reciprocal movement of the foot pedals by persons unable to achieve such movement independently. In a third embodiment, the vehicle includes a mechanism for preventing the transmission of power from the motorized drive mechanism to a foot support when reciprocal movement of the foot support is hindered by the leg of the occupant. The length of the frame and the position of the steering mechanism relative to the occupant are selectively adjustable so as to adapt the vehicle to different sized occupants. The length of reciprocal movement during each stroke of the foot supports is adjustable within a predetermined range.

18 Claims, 10 Drawing Figures

FIG-1
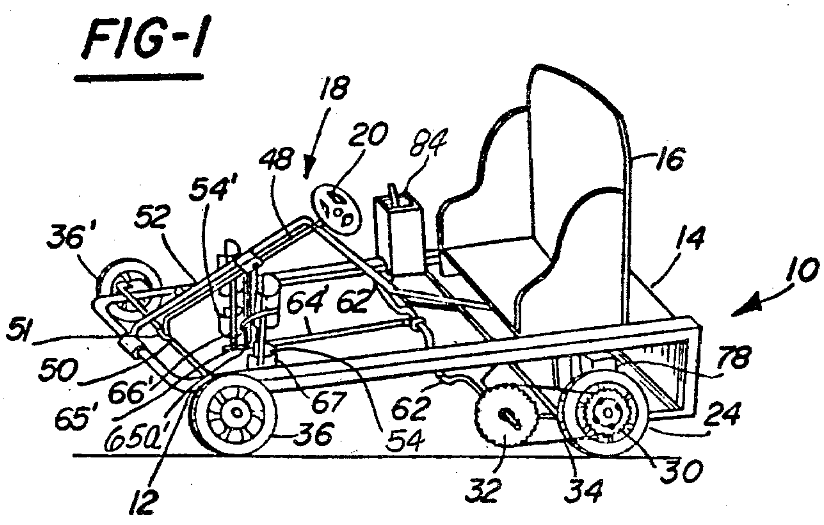
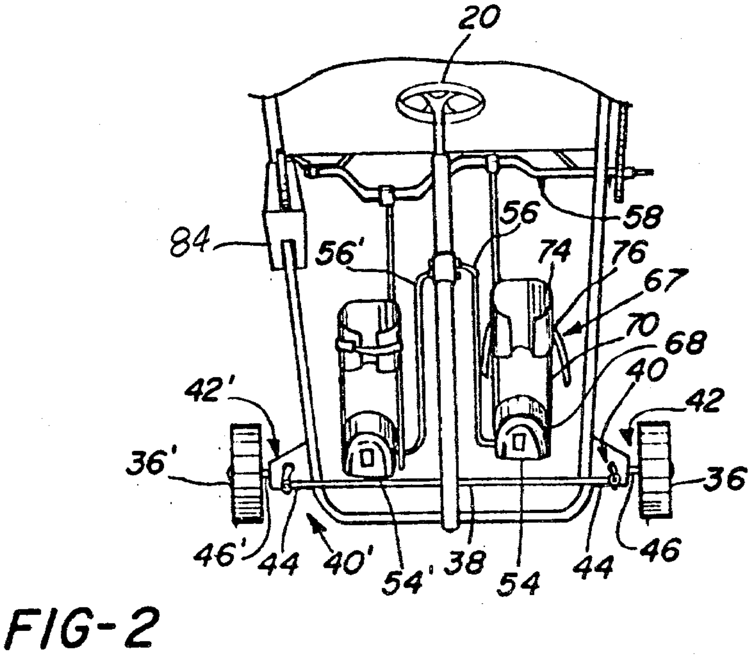
FIG-2

FIG-3
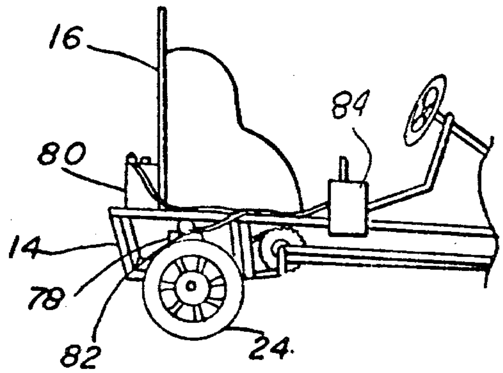
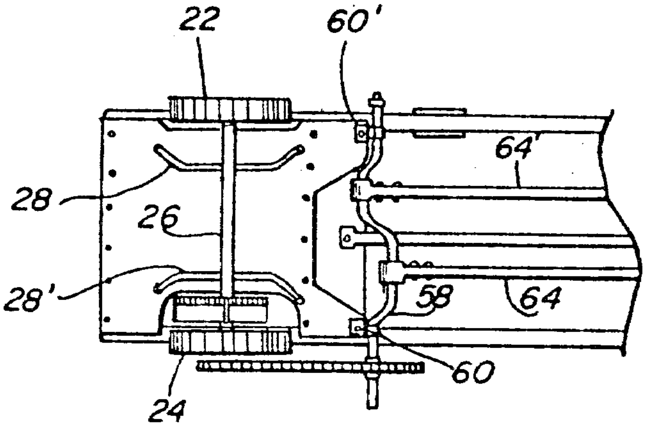
FIG-4

Fig-7
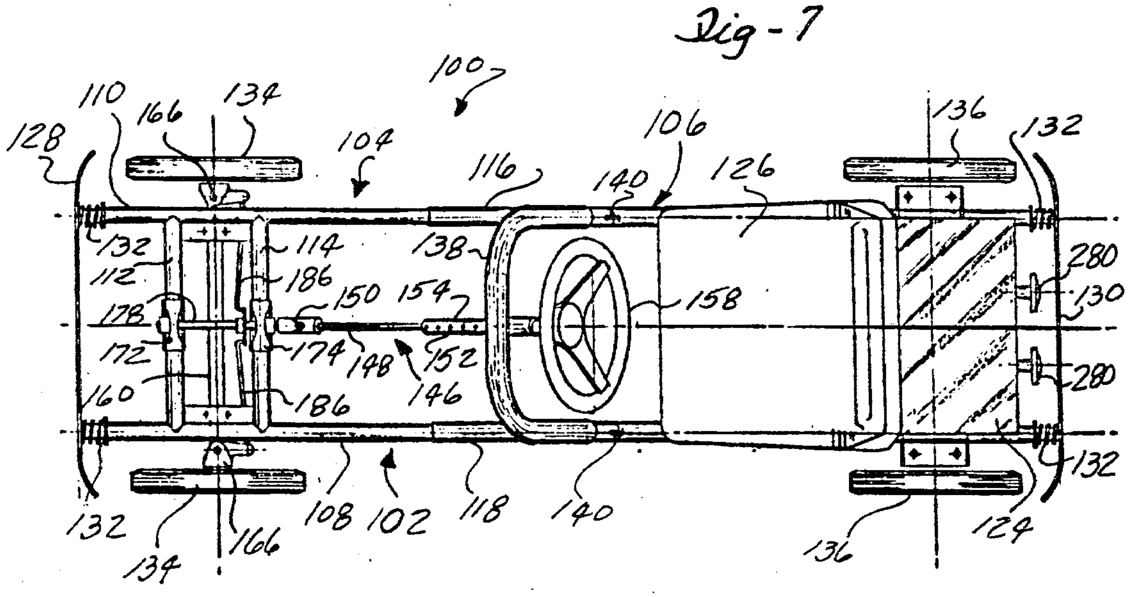
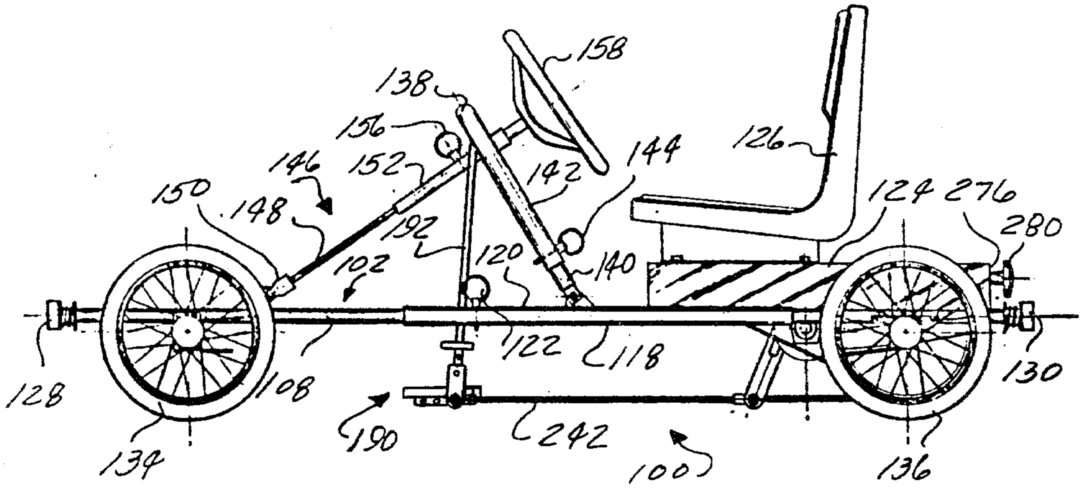
Fig-5

VELOCIPEDE FOR THE PHYSICALLY HANDICAPPED

CROSS REFERENCE TO CO-PENDING APPLICATION

This application is a continuation-in-part of co-pending application Ser. No. 965,573, filed Dec. 1, 1978, in the name of Larry D. Lay, now U.S. Pat. No. 4,284,157.

BACKGROUND OF THE INVENTION

1. Field of the Invention

The present invention pertains to exercise and locomotive devices. More particularly, the present invention pertains to vehicular exercise devices. Even more particularly, the present invention pertains to vehicles for the physically handicapped which enable non-ambulatory persons to exercise their legs.

2. Prior Art

Velocipedes have long been known wherein the reciprocal movement of treadles or foot pedals is translated to the rotary movement of wheels by means of an axle and crank. Vehicles of this general type are disclosed in U.S. Pat. Nos. 474,138 and 541,887, which comprise the most pertinent prior art of which applicant is aware.

Such devices afford the driver amusement and transportation as well as exercise. However, they require a considerable level of muscular strength for operation and, thus, are not suited for use by individuals lacking that minimum level of strength. For this reason, the therapeutic, muscle toning advantages, as well as the amusement and locomotive advantages of velocipedic devices have heretofore been unavailable to those having physical impairments of the lower extremities. Thus a great benefit would be realized if the velocipedic vehicle could be adapted for operation by persons having weakened legs. A further advantage would be gained by providing a velocipedic vehicle with a motor which would operate the drive means and the foot pedals associated therewith to achieve a reciprocal movement and valuable exercise for drivers incapable of achieving such movement independently. Thus, the present device would help to prevent the deterioration of muscles in non-ambulatory patients.

SUMMARY OF THE INVENTION

In accordance with the present invention there is provided a vehicle comprising a frame, a carriage portion having a seat mounted thereon, and front and rear wheels. At least one rear wheel is provided with drive means which is operated by the rotation of a drive axle which is provided with oppositely disposed cranks. The rotation of the drive axle is translated into the reciprocal movement of foot supports or pedals via reach rods, each reach rod extending between a foot pedal and a crank. At least one foot pedal, and if required, both foot pedals are provided with an orthopedic brace which furnishes support to the leg of the driver.

The vehicle is provided with a motor which effects directly the rotation of the drive wheel. The rotation of the drive axle is translated into a reciprocal movement of the braced foot pedals through the reach rods extending therebetween, thus providing exercise for the legs even where the driver is incapable of independent movement thereof.

In another embodiment, the velocipede is provided with a mechanism for preventing the transmission of power from the motorized drive means to at least one of the foot supports when reciprocal movement of the foot support is hindered by the leg of the occupant of the velocipede. In this manner, the foot support will not continue to reciprocate in the event that the knee of the occupant becomes locked-up or otherwise immobile.

In addition, means are provided to selectively adjust the amount or distance of travel of the stroke of each of the foot supports. Also, the length of the frame and the position of the steering mechanism can be selectively adjusted so as to adapt the velocipede to a wide range of different-sized occupants, such as children or adults.

BRIEF DESCRIPTION OF THE DRAWING

For a more complete understanding of the present invention, reference is made to the following detailed description and accompanying drawings wherein like reference numerals refer to like parts throughout the several views in which:

FIG. 1 is a perspective view of the present vehicle;

FIG. 2 is a partial, top plan view of the vehicle thereof;

FIG. 3 is a partial side view thereof;

FIG. 4 is a partial bottom plan view thereof;

FIG. 5 is an elevational view of another embodiment of the vehicle;

FIG. 7 is a plan view thereof;

DESCRIPTION OF THE PREFERRED EMBODIMENT

Figure 6:
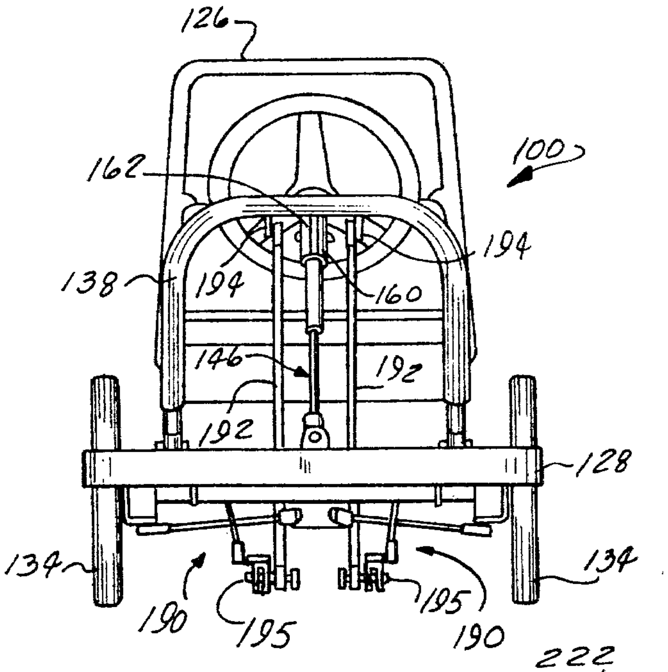
FIG. 6 is an end view of the vehicle shown in FIG. 5.

Now and with reference to FIG. 1, a recreational and exercise vehicle is illustrated generally at 10. The vehicle 10 comprises a frame 12 and a carriage portion 14 mounted thereon. The frame 12 is constructed from metal or any other suitably durable material. A seat 16 is mounted onto the carriage. The seat 16 is, preferably, provided with back and side supports to maximize safety and comfort of the driver.

The vehicle further comprises means for steering the vehicle indicated generally at 18, which may be operated by the driver by means of a steering wheel 20 in the known manner. It is to be understood that other suitable mechanical or motorized steering means may be employed within the scope of this invention.

The vehicle is provided with a plurality of wheels and, in the preferred embodiment, has two rear wheels 22, 24 at the rear of the vehicle, adjacent the carriage portion 14. As best illustrated in FIG. 4, one wheel is mounted on each side of the carriage 14 by means of an axle 26 extending across the bottom of the carriage 14. The axle 26 is secured to the bottom of the carriage by any suitable means such as by being welded to mounting rods 28,28' provided on the carriage 14 or the like. At least one rear wheel 24 is a driven wheel and is provided with a first sprocket 30 which cooperates with a second sprocket 32 through a chain 34 to achieve movement of the vehicle in a manner which will be explained more fully hereinbelow.

The vehicle 10 is further provided with at least one front wheel, although it is preferred that the vehicle be equipped with at least two front wheels for better stability. As illustrated in FIG. 2, front wheels 36,36' are mounted on each side of the frame 12 by means of a tie rod 38. The tie rod 38 terminates at each end in a knuckle, indicated generally at 40,40' through which means the front wheels 36,36' are pivotally mounted. Each knuckle 40,40' comprises a radius arm 44,44', which is connected pivotally to the tie rod and a medial, vertical portion which extends through a mounting support 42,42' provided on the frame. Each knuckle 40,40' further comprises a substantially horizontal spindle 46,46' upon which each front wheel 36,36' is mounted.

As best seen in FIG. 1, the steering means comprises a conventional pitman arm 48 which is mounted at one end to the steering wheel 20 and extends through an aperture 51 provided in a bracket 50, affixed to the tie rod 38 such that the rotation of the pitman arm 48 in response to the turning of the steering wheel 20 urges the arm 48 against the bracket 50 and the tie rod 38 turning the spindles 46,46' and the wheels 36,36' mounted thereto in the direction the steering wheel 20 is turned. It is to be appreciated that other well known steering devices, such as power steering or electronic directional selection may be incorporated into the present vehicle to permit operation thereof by persons having physical impairments which prevent their using manual steering means.

The steering wheel 20 is supported by a column 52. The support column 52 extends up from the front of the frame 12 and has an aperture adapted to receive the pitman arm 48 proximate the steering wheel 20, as shown in FIG. 1. The column 52 terminates at the carriage portion 14 and is secured thereto at any convenient point, such as under the seat 16.

Reciprocally movable foot supports or foot pedals 54,54', which are deployed proximate the front of the frame, are pivotally suspended from the support column 52 by means of pivot rods 56,56'.

The reciprocal movement of the pedals is achieved through a rotational movement of the driving means associated with the rear driven wheel 24. As indicated hereinbefore, the driven wheel 24 is provided with a first sprocket 30 which is connected to a second sprocket 32 through a chain 34. The second sprocket 32 is mounted to the vehicle in the same plane as the first sprocket 30 by means of a crank axle 58 which is secured to the vehicle proximate the driven wheel 24. The axle may be secured to the carriage 14 by means of a mounting bracket 60,60' as shown in FIG. 4.

The crank axle 58 is provided with a pair of opposed cranks 62,62' each crank being connected to a foot pedal by means of a reach rod 64,64'. Each reach rod 64,64' has a spindle portion 66,66' which extends through an aperture 65,65' provided in the reach rod 64,64' and has a foot pedal 54,54' mounted thereto. The reciprocal movement of the foot pedals 54,54' is translated from the cranks 62,62' through the reach rods 64,64' thereby rotating the crank axle 58.

As noted hereinbefore, the present vehicle is particularly adapted for use by persons whose lower extremities lack sufficient strength to operate vehicles of this type. Thus, a foot pedal for a disabled or weakened leg is provided with an orthopedic brace, generally indicated at 67. Although it is understood that either one or both foot pedals may be provided with a brace, only one will be described as the manner of assembly is identical for either foot. The brace 67 is provided with a foot piece 68 which is mounted on the pedal 54,54' and a vertical leg support 70. The brace further comprises a calf support 74 which is secured to the driver's leg by means of a strap 76. The brace 67 is secured to the pivot rod 56,56' at a point proximate the calf support 74. Thus, the strap 76 which secures the brace to the driver's leg may also serve to secure the brace to the pivot rod.

Additional benefits may be realized by providing a plurality of apertures 65*a'*, some not shown, in the reach rods 64,64'. Thus, the distance of the foot pedals from the seat 16 may be adjusted by altering the position of the spindle 66 upon which the foot pedal is mounted along the length of the reach rod. Moreover, additional thigh supports, (not shown), may be added to the brace where required. In this manner, the braces are secured to the foot pedals and the pivot rods in order that the weakened leg is supported in applying force to the foot pedals to achieve movement of the vehicle.

In accordance herewith, a drive motor 78 is mounted on vehicle 10 and is employed to drive the wheel 24, and, thus, the crank axle 58.

As best seen in FIG. 3 and FIG. 4, a drive motor 78 is mounted on the carriage 14 proximate the driven wheel 24. The motor may be of any suitable type such as conventional, battery powered electric motor. As shown in FIG. 3, the battery 80 may be mounted directly to the carriage 14 at any convenient location and electrically connected to the motor 78. A gear reducer 82 having an input shaft and an output shaft (not shown) is mounted on the carriage, the input shaft being rotatably connected to the drive motor 78. The drive wheel 24 is mounted to the output shaft. It is intended that the driver operate the vehicle by means of a conventional transmission box 84, not shown, electrically connected to the motor 78 and having forward, reverse and neutral positions.

When it is desired to operate the vehicle by means of the motor, the transmission is brought into forward or reverse position and the drive wheel is rotated accordingly, thereby moving the vehicle. The first sprocket 30 associated with the driven wheel 24 rotates therewith and the rotation of the first sprocket 30 is translated to the second sprocket 32 through the chain. The rotation of the second sprocket causes the crank axle 58 on which it is mounted to rotate, which rotation is translated to the foot pedals, 54,54' by means by the reach rods, 64,64' causing the reciprocal movement thereof. Thus, the motorized operation of the vehicle is translated back to achieve the reciprocal movement of the brace foot pedals, and the desired exercise of the leg muscles where the driver is incapable of achieving such movement himself.

Referring now to FIG. 5–10, there is disclosed another embodiment of the velocipede of this invention. In this embodiment, the vehicle 100 includes a motorized drive mechanism having means for selectively adjusting the stroke length at which each foot support reciprocates. The drive mechanism further includes means for preventing the transmission of power from the drive means to at least one of the foot supports when reciprocal movement of the foot supports is hindered by the leg of the occupant of the vehicle such as will occur in the event that the knee of the occupant becomes immobile or locked-up. This embodiment also includes an adjustable frame and steering mechanism which enables the vehicle to be sized so as to fit a wide range of occupants from both children to adults.

Referring now to FIGS. 5, 6 and 7, a detailed description of the construction of one embodiment of the vehicle 100 will now be presented. In this embodiment, the vehicle 100 includes an adjustable frame, denoted generally by reference number 102. The frame 102 is comprised of front and rear sections 104 and 106, respectively. The front section 104 is formed of a pair of spaced, longitudinally extending tubular shafts 108 and 110. First and second cross support shafts 112 and 114, respectively, extend between the longitudinally extending shafts 108 and 110 to provide a rigid support structure. The rear section 106 of the frame 102 also includes a pair of longitudinally extending tubular shaft members 116 and 118. A rear cross support member, not shown, is disposed between the longitudinally extending supports 116 and 118 to provide rigidity therefore.

The front and rear sections 104 and 106 of the frame 102 are respectively sized such that the longitudinal shaft members of the front section 104 are telescopingly received within the longitudinal shaft members of the rear section 106. The longitudinally extending shafts of the front and rear sections 104 and 106 each include a plurality of apertures, shown generally by reference number 120 in FIG. 5, which are aligned and secured by a ring pin 122 to maintain the front and rear sections 104 and 106 of the frame 102 in secure engagement. By means of the apertures 120 and the ring pin 122, the length of the frame 102 may be selectively adjusted so as to adapt the vehicle 100 to a wide range of different sized individuals.

The frame 102 further includes a suitable housing 124 mounted on the rear section thereof which covers the internal drive mechanism. Mounted on top of the housing 124 is a carriage 126. The carriage 126 may be in the form of a conventional seat in which the occupant rides.

Figure 10:
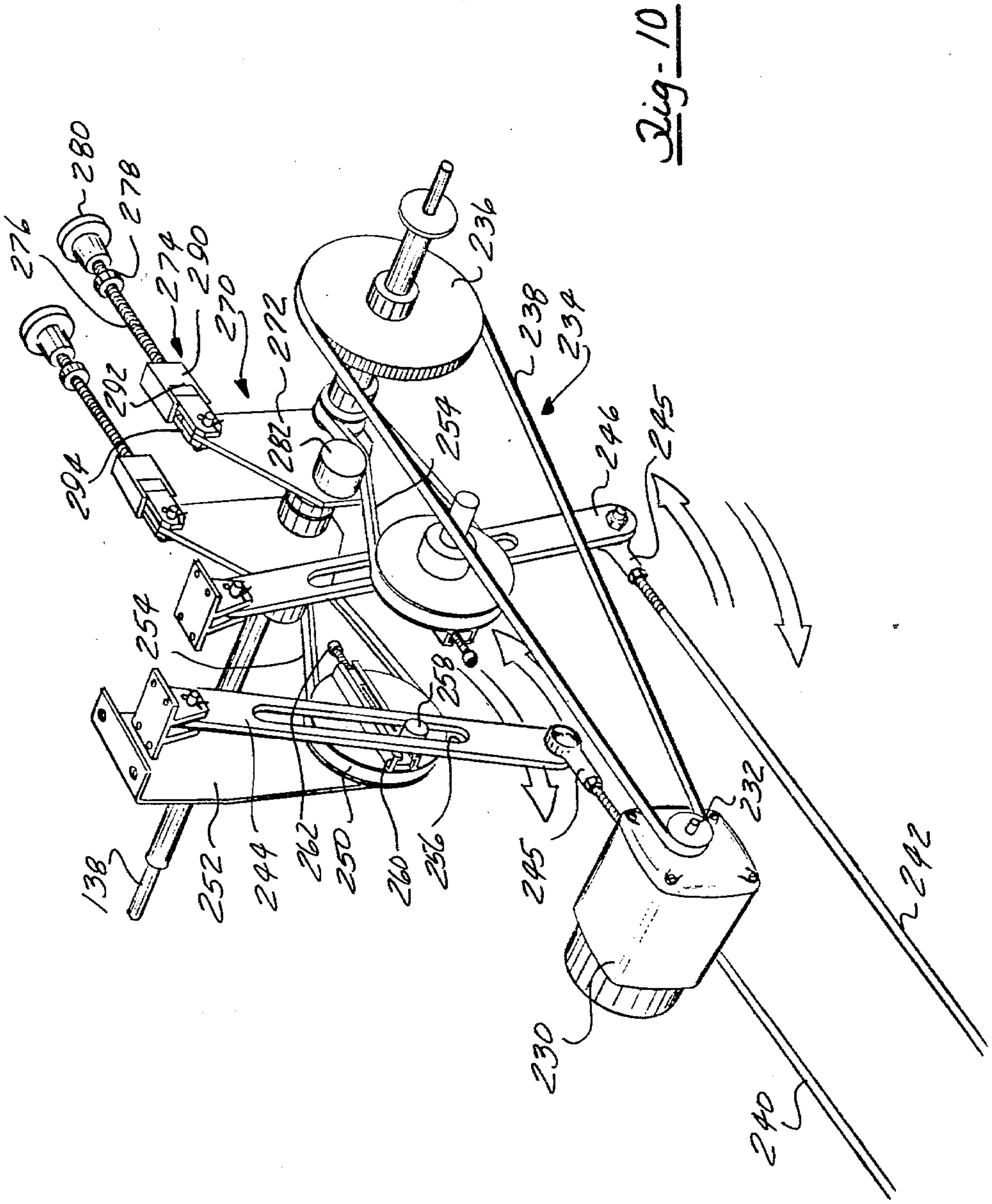
FIG. 10 is a partial perspective view of the drive mechanism of the vehicle.

Front and rear bumpers 128 and 130, respectively, are reciprocably secured to the longitudinally extending shafts of the frame 102. The front and rear bumpers 128 and 130 each comprise a plate member which is movably mounted to the longitudinal shafts by means of springs 132. A pair of front and rear wheels 134 and 136, respectively, are mounted to the vehicle 100 in any conventional manner. The connection of the front wheels 134 to the vehicle 100 will be described in greater detail hereafter. Referring briefly to FIG. 10, there is shown a rear axle 138 which is rotatably mounted to the frame 102 by means of conventional roller bearings. The rear wheels 136 are mounted at opposing ends of the rear axle 138 by conventional means, such as lug nuts.

Referring now to FIGS. 5–8, there is shown means, operably connected to the front wheels 134, for steering the vehicle 100. The steering means include a steering column upper support 138. The steering column upper support 138 is in the form of a substantially U-shaped tubular member which is adapted to be pivotably connected at opposing ends to the frame 102. A pair of tubular shafts 140 of smaller diameter than the steering column upper support 138 are telescopingly received within the opposed ends of the upper support 138. The reduced section shafts 140 are pivotably connected to the frame 102 at one end thereof. Further, the reduced section shafts 140 and the upper support 138 have a plurality of apertures 142 disposed therein. The apertures 142, when aligned and secured by a ring pin 144, enable the steering column upper support 138 to be adjusted in a substantially vertical direction so as to enable the steering means to be moved to fit the size of the occupant of the vehicle 100.

The steering means further includes a steering column assembly denoted generally by reference number 146. The steering column 146 comprises an elongated shaft 148 having a conventional universal joint 150 affixed to one end thereof. A second tubular shaft 152 is disposed over the elongated shaft 148 at a second end thereof. The second tubular shaft 152 includes a plurality of apertures 154. The apertures 154, when aligned with a suitable aperture in the first shaft 148 and secured by ring pin 156, enable the length of the steering column 146 to be adjusted to fit different sized occupants. A conventional steering wheel 158 is fixedly secured to the opposed end of the second shaft 152 so as to cause rotation of the entire steering column assembly 146 upon movement thereof.

A tubular bracket 160, shown in FIG. 6, is slidingly disposed over the second shaft 152 of the steering column 146. The bracket 160 comprises a substantially elongated tubular member having a flange portion which is fixedly secured to a pair of depending flanges 162 on the steering column upper support 138. The bracket 160 serves to hold the steering column assembly in position.

By means of the apertures, ring pins and telescoping tubular members, the entire steering means may be selectively adjusted such that the position of the steering wheel 158 may be positioned to suit a wide range of different sized occupants of the vehicle 100. In addition, the entire steering may be pivoted about the first end at the universal joint 150 by simply removing the ring pins 144 from the steering column upper support 138. This permits easy ingress and egress of the occupant from the velocipede 100.

Figure 8:
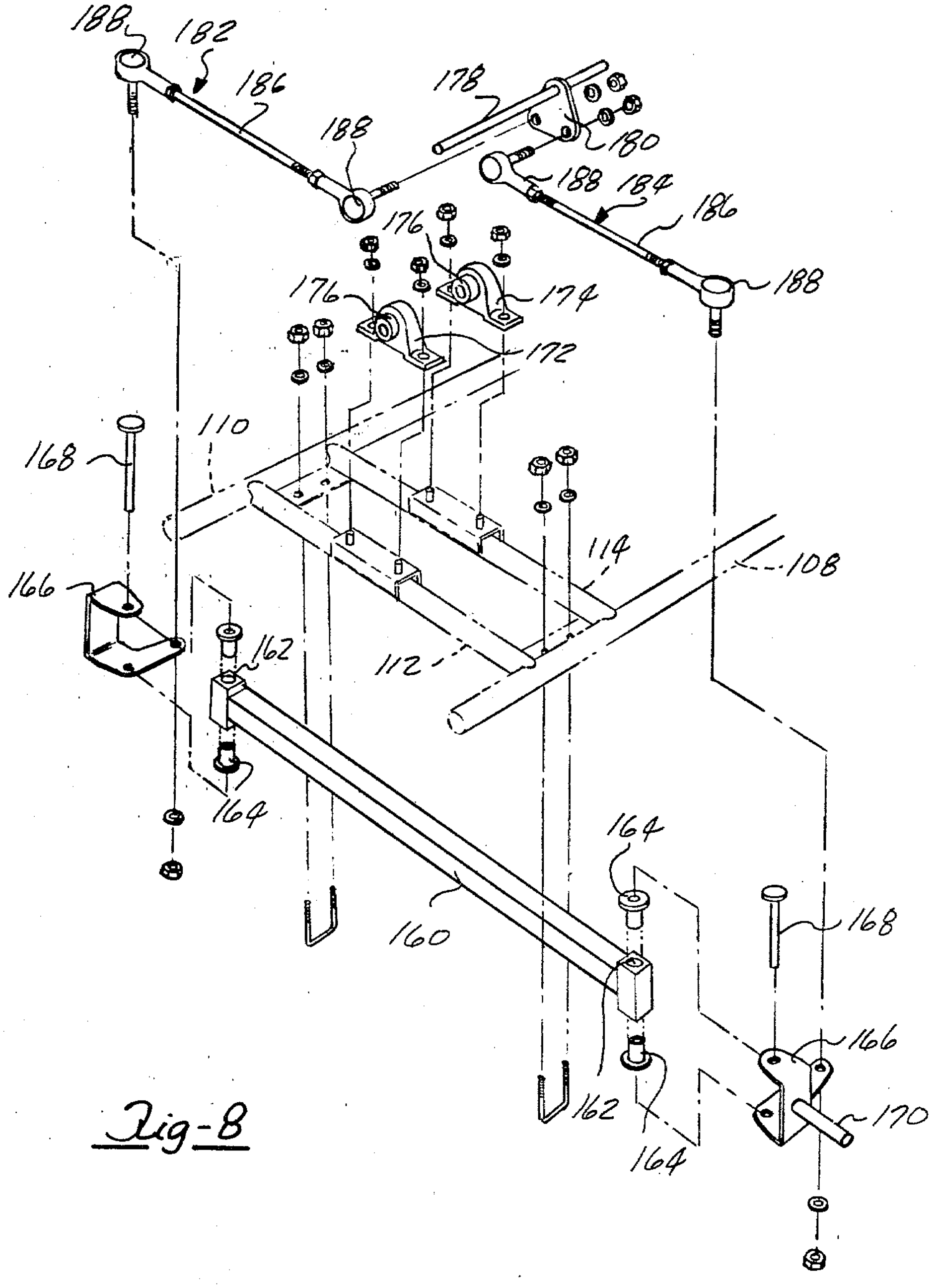
FIG. 8 is an exploded perspective view of the steering mechanism of the vehicle shown in FIG. 5.

Referring now to FIGS. 7 and 8, the connection of the steering column 146 to the front wheels 134 of the vehicle will now be described in detail. The steering means includes a laterally extending front axle 160. The front axle 160 has vertically extending apertures 162 disposed at each end thereof. Conventional bearings 164 are disposed within the apertures 162 to permit rotation of axle pivot arms 166. The axle pivot arms 166, which are identically constructed, generally comprise a bracket having a pair of spaced flanges which are respectively disposed over the top and bottom ends of the apertures 162 on the front axle 160. A connecting pin 168 is inserted through apertures in the axle pivot arms 166 to rotatably secure the axle pivot arms 166 to the front axle 160. The axle pivot arms 166 further include an outward extending shaft 170 which serves as a mounting support for the front wheels 134 which can be mounted thereon and secured by any conventional means, such as lug nuts, not shown.

The bottommost flange of the axle pivot arms 166 further includes an elongated portion which provides the connection between the axle pivot arms 166 and tie rods, as described in greater detail hereafter. As shown in FIGS. 7 and 8, a pair of conventional pillow blocks 172 and 174 are mounted on the frame cross supports 112 and 114, respectively. Bearings 176 mounted within the pillow blocks 172 and 174 rotatably hold a lower steering shaft 178. The lower steering shaft 178 has one portion of the U-joint 150 journalled at one end thereon, as shown in FIG. 7. A mounting plate 180 is fixedly secured to the lower steering shaft 178 and is rotatable therewith.

A pair of tie rod assemblies 182 and 184 are secured to the mounting plate 180. The tie rod assemblies 182 and 184 each comprise an elongated shaft 186 which has a pair of ball and socket joints 188 mounted at opposed ends thereof. One of the ball and socket joints 188 is secured to the mounting plate 180 and the opposed ball and socket 188 is mounted to the bottom flange of one of the axle pivot arms 166. In this manner, rotation of the steering column 146 is transmitted through the lower steering shaft 178 and tie rod assemblies 182 and 184 to the axle pivot arms 166 which turn the wheels 13 of the vehicle 100 in the direction that the steering wheel 158 is turned by the occupant of the vehicle 100.

The vehicle 100 also includes at least one and preferably a pair of foot supports, denoted generally by reference number 190, in FIG. 5, which are connected to the drive means of the vehicle 100 and are adapted for reciprocal movement. The foot supports 190 are mounted to a pair of depending arms 192 which are pivotably connected to flanges 194 mounted on the steering column upper support member 138, as shown in FIG. 6. An outwardly extending rod 195 extends from the bottom end of the arms 192. The rod 195 serves as a mounting support for the foot support 190.

Figure 9:
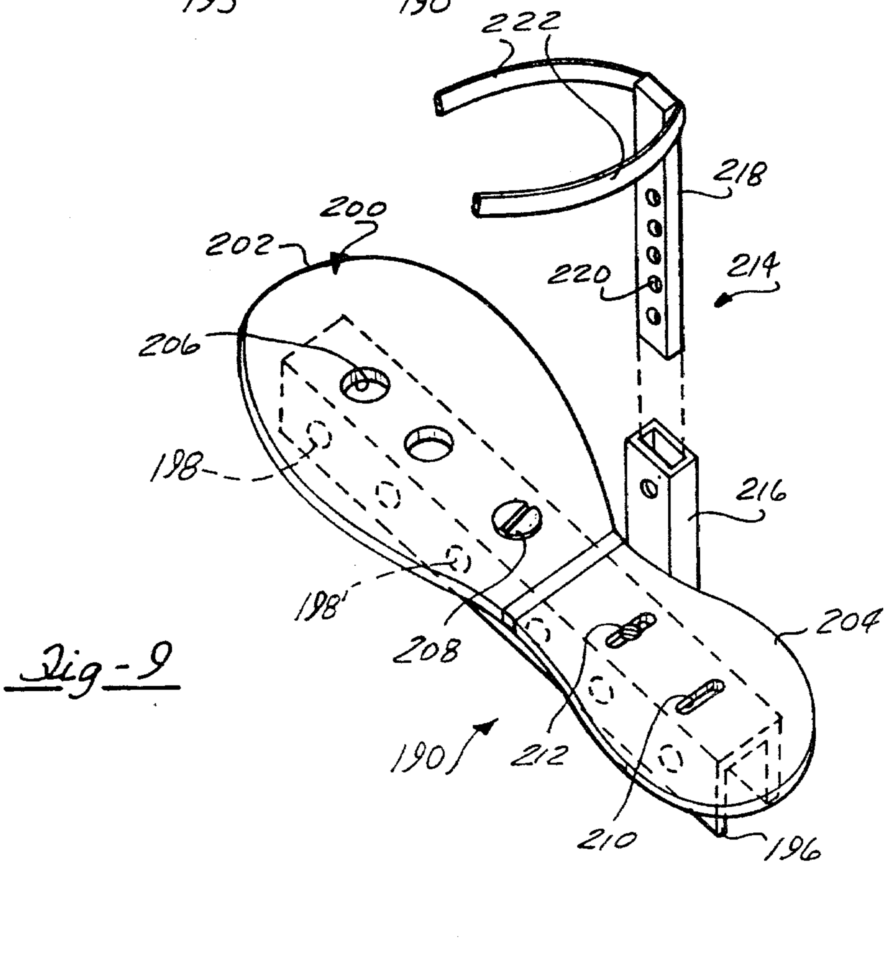
FIG. 9 is a perspective view of one of the foot supports of the vehicle.

Referring now to FIG. 9, a foot support 190 includes a substantially U-shaped channel member 196. The channel member 196 has a plurality of aligned apertures 198 formed in opposing sides thereof. The rod 195 connected to the depending arms 192 is insertable through the aligned apertures 198 so as to mount the foot support 190 to the depending arm 192. Furthermore, the position of the foot support 190 with respect to the rod 194 may be selectively adjusted by using other apertures 198 such that different portions of the occupant's foot may be exercised during the operation of the vehicle 100.

The foot support 190 further includes a substantially flat plate 200 which is comprised of front and rear sections 202 and 204. The front portion 202 has a plurality of apertures 206 formed therein which can be aligned with apertures formed in the top portion of the channel member 196 such that the position of the front portion 202 of the plate 200 may be adjusted with respect to the rear section 204 and secured to the channel member 196 by conventional fasteners, shown generally by reference number 208. In this manner, the length of the foot support 190 may be adjusted to suit the size of the occupant.

The rear portion 204 of the plate 200 includes a plurality of elongated slots 210. The slots 210 are aligned with apertures formed in the top portion of the channel member 196 such that the back portion 204 may be secured to the channel member 196 by conventional fasteners 212. The slots 210 enable the back portion 204 to be selectively pivoted so as to fit a wide variety of foot positions about the top of the channel member 196.

A brace 214 is secured to the foot support 190. The brace 214 comprises a first section 216 which is fixedly secured to the channel member 196. The first portion 216 comprises a substantially hollow tubular member having lateral apertures formed therein. The first portion 216 telescopingly receives an elongated shaft 218 which has a plurality of laterally extending apertures 220 formed therein. Thus, the height of the brace 214 may be selectively adjusted by aligning the apertures in the first portion 216 and the shaft 218 which can then be secured by a pin, not shown. A band 222 is secured to the top end of the shaft 218. Conventional fasteners, not shown, which can include buckles or releasable fasteners sold under the registered trademark "Velcro" are connected to opposing ends of the band 222 to enable the band to be disposed around the leg of the occupant so as to secure the leg of the occupant to the foot support 190.

Means are provided for driving the rear wheels of the vehicle 100. As shown in FIG. 5 and in greater detail in FIG. 10, the driving means includes suitable motorized means, such as an electric motor 230, which is mounted to the frame 102 and is disposed within the rear housing 124 of the vehicle 100. The electric motor 230 has an output shaft 232 extending therefrom and suitable conventional controls, not shown, for changing the direction of rotation of the output shaft 232 so as to drive the vehicle 100 in forward or reverse directions. The motor 230 is energized by a suitable power source, such as a conventional battery, not shown. The battery can be mounted within the housing 124 adjacent to the motor 230.

The motor controls include a control lever, not shown, which is mounted on the frame 102 next to the carriage 126. Preferably, the control lever is biased to a neutral position so as to require constant forward movement to advance the vehicle 100. A detent may also be provided to lock the control lever in the forward position. Forward and reverse selection may be provided on the control lever or by a separate switch on the motor 230. According to this embodiment, suitable switch means, such as conventional microswitches, not shown, are provided adjacent to each spring 132 at the ends of the bumpers 128 and 130. The microswitches are actuated by movement of the bumpers 128 and and 130 such as occurs when the vehicle 100 strikes an object. The microswitches are incorporated into suitable control circuitry which functions to de-energize the motor 230 whenever one of the microswitches is actuated. The motor 230 must then be switched to the opposite direction of movement to move the vehicle 100 away from the impeding object.

Means, denoted by reference number 234, are provided to connect the motor 230 to the rear wheels 136 so as to propel the velocipede 100. The connecting means 234 comprises a pulley 236 which is fixedly secured to the rear axle 138 of the vehicle 100. A belt 238 connects the pulley 236 with the output shaft 232 of the motor 230 such that rotation of the output shaft 232 of the motor 230 is transmitted through the belt 238 and the pulley 236 to the rear axle 138 causing rotation thereof.

Means are also provided for connecting the rear axle 138 to the foot supports 190 mounted on the arms 192. This second connecting means comprises a pair of reach rods 240 and 242 and a pair of pivot links 244 and 246. The reach rods 240 and 242 are connected at a first end to the bottom portion of the depending arms 192. The second end of each of the reach rods 240 and 242 is pivotably connected by a ball and socket joint 245 to the lower or second end of the pivot links 244 and 246, respectively, such that rotation of the pivot links 244 and 246 is transmitted through the reach rods 240 and 242 to the foot supports 190 causing opposed reciprocal movement of the foot supports 190.

Means are also provided for connecting the rear axle 138 to the respective pivot links 244 and 246 such that rotation of the rear axle 138 is transmitted to rotation of the pivot links 244 and 246 to cause the above-described reciprocal movement of the foot supports 190.

Since this connecting means is identical for each pivot link 244 and 246, only one such connecting means will be described in detail hereafter. The connecting means associated with pivot link 244 includes a pulley 250 which is rotatably mounted to a bracket 252 secured to the rear housing 124 of the vehicle 100. A belt 254 connects the pulley 250 to the rear axle 138 to transmit rotation of the rear axle 138 to the pulley 250.

The pivot links 244 and 246 each comprise an elongated member having an integral slot 256 formed therein. The pivot links 244 and 246 are pivotably connected at a first end to the rear housing 124 of the vehicle 100 and to the reach rods 240 and 242 at the opposed end.

A pin 258 extends outward from the pulley 250 and is disposed within the slot 256 in the pivot link 244 and is slidingly movable along the length of the slot 256 as the pulley 250 rotates. As the pulley 250 rotates, such rotation is transmitted through the pin 258 to the pivot link 244 causing the pivot link 244 to pivot about the first end.

Means are also provided for adjusting the length of the stroke or movement of the foot supports 190. The adjusting means comprises a substantially U-shaped channel 260 mounted to the pulley 250. The pin 258 is slidingly disposed within the channel member 260 and is connected to a threaded rod 262 which can be adjusted so as to change the position of the pin 258 on the pulley 250. As the position of the pin 258 is adjusted with respect to the center of the pulley 250, differing amounts of movement of the pivot link 244 is effected. In the preferred embodiment, the diameter of the pulley 250 is chosen so as to provide a reciprocal stroke of the foot supports 190 from 0 inches to 8 inches depending upon the position of the pin 258. It should also be noted that a different stroke may be provided for each individual foot support 190.

The vehicle 100 further includes means for preventing the transmission of force from the drive means to the foot supports when reciprocal movement of either of the foot support is hindered by the leg of the occupant. This prevents further reciprocal movement of the foot support 190 when the knee of the occupant has become immobile or locked-up.

Identical force preventing means 270 are associated with each pivot link 244 and 246. Thus, only one of the identical force preventing means 270 will be described in detail hereafter. The force preventing means 270 includes a plate 272 which is pivotably disposed about the rear axle 138 at a first end. A connector 274 is pivotably connected to the plate 272 at a second end. The connector 274 comprises a pressure guide 290 having an internal threaded bore and a recess 292. The bore receives a threaded rod 276. The connector 274 also includes a U-shaped member 294 which has a dowel pin, not shown, extending from the end which engages the end of the threaded rod 276. The U-shaped member 294 is pivotably disposed within the recess 292 in the pressure guide 290 such that the spaced sides extend towards and straddles opposite sides of the plate 272. A pivot pin extends through the sides of the member 294 and the plate 272 and is secured thereto by a cotter pin to provide an articulated joint between the guide 290 and the member 294. A spring, not shown, is disposed within the recess 292 in the guide 290 around the dowel to eliminate any slack between the guide 290 and the member 294.

The threaded rod 276 extends through the rear of the housing 124, as shown in FIG. 5, and is maintained in position by a collar 278, FIG. 7, which is disposed in registry with the inner surface of the housing 124. A knob 280 is secured over the exterior end of the threaded rod 276 and is adapted for unitary rotation therewith.

In use, the knob 280 is rotated clockwise to increase the tension on the belt 254 or counterclockwise to decrease the tension. Depending upon the direction of rotation of the knob 280, the corresponding rotation of the threaded rod 276 will cause the pressure guide 290 and the U-shaped member 294 to move to the left or right in the orientation shown in FIG. 10. This movement will cause the plate 272 to pivot about the rear axle 138 to effect the desired amount of tension on the belt 254. Such movement of the rod 276 causes a corresponding movement of the second end plate 272 such that the plate 272 will rotate about the first end pivotably connected about the rear axle 138.

A roller 282 is affixed to the plate 272 and extends outward therefrom. The roller 282 is adapted to contact the belt 254. Thus, it is evident that rotation of the plate 272 will cause the roller 282 to exert more or less force on the belt 254 depending on which direction the plate 272 is rotated.

In operation, the threaded rod will be positioned such that the roller 282 will apply a predetermined amount of tension to the belt 254. The rod 276 can be calibrated so as to indicate a predetermined amount of tension exerted by the roller 282 on the belt 254. If, during the use of the velocipede 100, the knee of the occupant becomes immobile or locked-up, the associated foot support 190 will be urged to a stationary position by such locked knee of the occupant. This force will resist movement of the associated reach rod and pivot link such that the belt 254 will slip around the pulley 250 and no further driving force from the rear axle 138 will be transmitted through the pivot links and reach rod to the foot support 190. In this manner, damage to the knee of the occupant is prevented. By increasing or decreasing the tension exerted on the belt 254, the point at which the prevention of transmission of force from the rear axle to the foot supports will be initiated and can be selected to fit a particular occupants needs and physical condition. It should also be noted that different amounts of tension can be applied to each leg of the occupant and, one foot support may be immobilized while the other foot support continues to reciprocate in the normal manner.

What is claimed is:

1. A vehicle for the physically handicapped comprising:
- a frame;
- a carriage portion mounted on said frame;
- at least one front and two rear wheels;
- means, operably connected to said front wheel, for steering said vehicle;
- means for driving at least one of said front and rear wheels, said driving means comprising:
- a foot support connected to said driving means and adapted for reciprocal movement;
- a brace connected to said foot support for connecting the leg of the occupant to said foot support; and
- means, operably connected to said drive means, for preventing the transmission of driving force to said foot support when reciprocal movement of said foot support is hindered by the leg of the occupant.

2. The vehicle of claim 1 wherein the length of the frame is adjustable.

3. The vehicle of claim 1 wherein the steering means is pivotable about its connection to the front wheel to permit ingress and egress to and from said vehicle.

4. The vehicle of claim 1 wherein the position of the steering means is selectively adjustable in both the horizontal and vertical directions.

5. The vehicle of claim 1 wherein:

said vehicle includes a pair of foot supports;

the driving means includes means, connected to the foot supports, for moving said foot supports in opposed simultaneous reciprocal directions; and said driving means further includes means for selectively adjusting the amount of reciprocal movement of each stroke of said foot supports.

6. The vehicle of claim 5 wherein the adjusting means is independently operative for each foot support so as to provide different amounts of stroke for each foot support.

7. The vehicle of claim 1 further including means for adjustably setting the force at which the prevention of transmission of further driving force to the foot support is initiated.

8. The vehicle of claim 7 wherein the preventing means includes first and second independently operable preventing means respectively associated with each foot support.

9. The vehicle of claim 1 wherein said velocipede includes a rear axle connecting the rear wheels and wherein the driving means includes an electric motor having a rotatable output shaft;

said vehicle further including means for connecting said output shaft of said motor to said rear axle.

10. The vehicle of claim 9 wherein the driving means further includes means for connecting the rear axle to the foot supports to cause reciprocal movement thereof.

11. The vehicle of claim 10 wherein the means for preventing the transmission of driving force is operably connected to the connecting means to prevent the transmission of driving force when reciprocal movement of the foot support is hindered by the leg of the occupant.

12. A vehicle for the physically handicapped comprising:

a frame;

a carriage mounted on said frame;

a pair of front wheels and a pair of rear wheels, said rear wheels connected by an axle;

means, operably connected to said front wheels, for steering said vehicle;

motor means having a rotatable output shaft for driving said rear wheels;

foot supports pivotably mounted to said frame;

an orthopedic brace for connecting a leg of an occupant to a foot support;

means for connecting said driving means to said foot supports to cause reciprocal movement of said foot supports; and means, operably connected to said driving means and said connecting means, for preventing the transmission of force to at least one of said foot supports when reciprocal movement of said one foot support is hindered by the leg of the occupant.

13. A vehicle for the physically handicapped comprising:

a frame;

a carriage mounted on said frame;

a pair of front wheels and a pair of rear wheels, said rear wheels connected by a rear axle;

means, operably connected to said front wheels, for steering said vehicle;

motor means having a rotatable output shaft for driving said rear wheels;

foot supports pivotably mounted to said frame;

an orthopedic brace for connecting a leg of an occupant to a foot support;

means for connecting said driving means to said foot supports to cause reciprocal movement of said foot support, said connecting means including:

first and second drive rods reciprocally connected to said foot supports at a first end;

first and second pivot links pivotably connected to said frame at a first end and pivotably connected to said first and second drive rods at the opposed end;

first means for connecting said output shaft of said motor means to said rear axle to cause rotation of said rear axle; and second means for connecting said rear axle to said first and second pivot links to cause pivotal movement thereof upon rotation of said rear axle; and means, operably connected to said driving means and said connecting means, for preventing the transmission of force to at least one of said foot supports when reciprocal movement of said one foot support is hindered by the leg of the occupant.

14. The vehicle of claim 13 wherein the first connecting means comprises:

a first pulley mounted on the rear axle; and a first belt rotatably connecting said first pulley with the output shaft of the motor; and wherein;

the second connecting means comprises:

second and third pulleys rotatably mounted on said frame;

second and third belts respectively rotatably connecting said second and third pulleys to said rear axle;

an integral slot formed in each of the first and second pivot links; and a pin extending outward from each of said second pulleys and slidably reciprocating within said slot in said first and second pivot links to cause pivotal movement of said first and second pivot links upon rotation of said second and third pulleys, respectively.

15. The vehicle of claim 14 further including means for adjusting the amount of rotational movement of the first and second pivot links for each complete rotation of the second and third pulleys, respectively.

16. The vehicle of claim 15 wherein the adjusting means comprises the pins being adjustably mounted on the second and third pulleys such that the position of the pins on the surface of said second and third pulleys can be radially adjusted to cause varying amounts of rotationl movement of the pivot links as the pins rotate with the respective second and third pulleys.

17. The vehicle of claim 14 wherein the means for preventing the transmission of driving force to the foot support comprises:

a plate pivotally mounted to the rear axle;

a roller extending from said plate and adapted to engage one of the second and third belts and apply force thereto to cause said one belt to slip about the respective pulley when a predetermined amount of force is applied to said foot support by the occupant in opposition to the reciprocal movement of said foot support; and means for changing the angular position of said roller to change the force applied to said one belt.

18. The vehicle of claim 17 wherein the angular position changing means comprises:

a threaded rod, said rod connected to the plate at a first end;

said rod being threadingly movable with respect to the frame to pivot said plate and move the roller with respect to the belt.

* * * * *